US009003133B2

(12) United States Patent
Gallo et al.

(10) Patent No.: US 9,003,133 B2
(45) Date of Patent: *Apr. 7, 2015

(54) APPARATUS FOR STORING/READING DATA IN A MEMORY ARRAY OF A TRANSPONDER

(71) Applicant: NXP B.V., Eindhoven (NL)

(72) Inventors: Francesco Gallo, Graz (AT); Hauke Meyn, Krempermoor (DE)

(73) Assignee: NXP, B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,406

(22) Filed: Feb. 18, 2014

(65) Prior Publication Data

US 2014/0215166 A1 Jul. 31, 2014

Related U.S. Application Data

(63) Continuation of application No. 13/681,148, filed on Nov. 19, 2012, now Pat. No. 8,688,929, which is a continuation of application No. 12/519,742, filed as application No. PCT/IB2007/055022 on Dec. 11, 2007, now Pat. No. 8,341,361.

(30) Foreign Application Priority Data

Dec. 22, 2006 (EP) ..................................... 06026735

(51) Int. Cl.
*G06F 12/00* (2006.01)
*G06F 3/06* (2006.01)
(Continued)

(52) U.S. Cl.
CPC .......... *G06F 3/0604* (2013.01); *G06K 7/10237* (2013.01); *G06Q 20/341* (2013.01);
(Continued)

(58) Field of Classification Search
CPC ... G06F 9/4411; G06F 12/1441; G06F 3/067; G06F 9/4401; G06F 13/102; G06F 2212/1004; G06F 3/023; G06F 9/54; G06F 13/385; G06F 13/40; G06F 13/42; G06F 13/4282; G06F 19/322; G06F 19/328; G06F 17/30876; G06Q 20/3229; G06Q 20/10; G06Q 20/32; G06Q 20/322; G06Q 20/3226; G06Q 20/3278; G06Q 20/341; G06Q 20/3563; G06Q 20/3574; G06Q 20/35765; G06Q 30/0641; G06Q 20/20; G06Q 20/204; G06Q 20/382
USPC .................................... 711/171, 154, E12.001
See application file for complete search history.

(56) References Cited

U.S. PATENT DOCUMENTS

| 5,226,155 A | 7/1993 | Iijima |
| 2006/0016870 A1 | 1/2006 | Bonalle et al. |
| 2007/0276985 A1 | 11/2007 | Schuessler |

FOREIGN PATENT DOCUMENTS

| GB | 2 333 630 A | 7/1999 |
| WO | 03/042799 A2 | 5/2003 |

OTHER PUBLICATIONS

Ferrari, J. et al. "Smart Cards: A Case Study", IBM, 234 pgs, retrieved from the internet at: http://www.redbooks.ibm.com/ redbooks/pdfs/sq245239.pdf (Oct. 1998).

(Continued)

*Primary Examiner* — Yong Choe

(57) ABSTRACT

An apparatus for storing or reading data in a memory array of a transponder and a corresponding transponder, read/write device and program element is described. Therein, a data file system for storing data within the memory array is defined by a predetermined protocol. The storing additional data includes checking whether a memory size of the application data file is larger than the memory size indicated by the application data length indicator; and storing second application data in a partial memory area of the application data file not occupied by the first application data. Thereby, memory areas which, according to the predetermined protocol, are not used can be used for new applications, data can be hidden in these areas such that they can not be read by protocol compliant reader devices and the data structure read or written is compatible with the former predetermined protocol.

4 Claims, 3 Drawing Sheets

(51) Int. Cl.
*G06K 7/10* (2006.01)
*G06Q 20/34* (2012.01)
*G07F 7/10* (2006.01)
*H04B 5/00* (2006.01)

(52) U.S. Cl.
CPC ........ *G06Q20/35765* (2013.01); *G07F 7/1008* (2013.01); *G06F 3/067* (2013.01); *G06F 3/0643* (2013.01); *G06F 3/0683* (2013.01); *H04B 5/0062* (2013.01)

(56) References Cited

OTHER PUBLICATIONS

"Type 4 Tag Operation—Technical Specification", NFC Forum, 75 pgs., retrieved from the Internet at: www.nfc.Forum.org/specs/ (Mar. 2007).

"Type 2 Tag Operation—Technical Specification", NFC Forum, 48 pgs. retrieved from the Internet at: http://www.nfc-forum.org.specs/ spec_license_download_spec_ 85a9d762b002007ic719cb9b2c5a5b94b3141dda/NFCForum-TS-Type-2-Tag_1.0.pdf (Jul. 2007).

International Search Report for Int'l Appl. No. PCT/IB2007/055022 (Feb. 7, 2008).

APPARATUS FOR STORING/READING DATA IN A MEMORY ARRAY OF A TRANSPONDER

This application is a Continuation Application of U.S. application Ser. No. 13/681,148 filed on Nov. 19, 2012 entitled "A method for storing data as well as a transponder, a read/write-device, a computer readable medium including a program element and such a program element adapted to perform this method" which is a Continuation of U.S. application Ser. No. 12/519,742 filed on Jun. 17, 2009 entitled "A method for storing data as well as a transponder, a read/write-device, a computer readable medium including a program element and such a program element adapted to perform this method" which claims priority to EP Application No. 06026735.8 filed on Dec. 22, 2006 and PCT Application IB2007/055022 filed on Dec. 11, 2007.

FIELD OF THE INVENTION

The present invention relates to the field of storing and reading data in a transponder wherein data can be stored in accordance with a storage protocol. Particularly, the present invention relates to storing and reading additional data in a transponder such as an all contactless memory card or a RFID (Radio Frequency IDentification) tag in which data can be stored in accordance with the Type 4 Tag Operation standardization of the NFC Forum.

BACKGROUND OF THE INVENTION

Identification products such as smart cards and RFID tags are used widely in fields such as transport (ticketing, road tolling, baggage tagging), finance (debit and credit cards, electronic purse, merchant card), communications (SIM card for GSM phone), and tracking (access control, inventory management, asset tracking). Radio Frequency IDentification (RFID) is an automatic identification method, relying on storing and remotely retrieving data using devices called RFID tags or transponders. An RFID tag is an object that e.g. can be attached to or incorporated into a product, animal, or person e.g. for the purpose of identification using radio waves. Chip-based RFID tags contain e.g. silicon chips and antennas. Passive tags require no internal power source, whereas active tags require a power source.

International standard ISO14443A is an industry standard for contactless smart cards. ISO14443A-compliant products provide RF communication technology for transmitting data between a card or tag and a reader device. For example, in electronic ticketing for public transport, travelers just wave their card over a reader at the turnstiles or entry point, benefiting from improved convenience and speed in the ticketing process. Such products are set to be the key to individual mobility in the future, supporting multiple applications including road tolling, airline tickets, access control and many more.

Evolving from a combination of contactless identification and networking technologies, Near Field Communication (NFC) (see for example the standard ISO 18092) is a very short-range wireless technology, for distances measured in centimeters, and is optimised for intuitive, easy and secure communications between various devices without user configuration. In order to make two devices communicate, users bring them close together or even make them touch. The devices' NFC interfaces will automatically connect and configure themselves to form a peer-to-peer network. NFC can also bootstrap other protocols like Bluetooth™ or Wireless Ethernet (WiFi) by exchanging the configuration and session data. NFC is compatible with contactless smart card platforms. This enables NFC devices to read information from these cards, making contactless smart cards the ideal solution for bringing information and vouchers into the NFC world.

NFC devices can also operate like a contactless card making them compatible with the huge installed infrastructure of ISO14443A-compliant systems. This functionality is called card emulation. Secure NFC combines NFC applications with smart card security. Devices with secure NFC act like a contactless smart card with cryptographic capabilities. This means that confidential data, and data that represents values, is stored in a secure memory area and always stays on the card. Authentication is performed by the NFC device itself and transmitted data can be encrypted by the NFC device using a private encryption key stored in the device's secure memory.

The Near Field Communication Forum (NFC Forum) is a non-profit industry association founded by Nokia Corporation, Royal Philips Electronics and Sony Corporation to advance the use of NFC short-range wireless interaction in consumer electronics, mobile devices and PCs. The NFC Forum will promote implementation and standardization of NFC technology to ensure interoperability between devices and services.

To store NFC Forum defined data (called NDEF—NFC Data Exchange Format) e.g. inside contactless cards or RFID tags four different draft specifications have been made called: "Type 1 Tag Operational", "Type 2 Tag Operational", "Type 3 Tag Operational" and "Type 4 Tag Operational".

This invention is related to contactless cards or RFID tags that are compliant to the "Type 4 Tag Operational" specification Version 1.0 of the NFC Forum.

There may be a need for an alternative way of storing and reading data in transponders such as contactless cards or RFID tags. Especially, there may be a need for a way of storing additional data in transponders such that the additional data is not accessible using a reader device which is compliant with a standardization protocol such as the "Type 4 Tag Operational" draft specification of the NFC Forum and such that it does not interfere with data stored in compliance with the standardization protocol. Furthermore, there may be a need for corresponding transponder devices, read/write devices, computer program elements and computer readable media for implementing such storing/reading method.

SUMMARY OF THE INVENTION

This need may be met by the subject matter according to the independent claims. Advantageous embodiments of the present invention are described in the dependent claims.

According to a first aspect of the invention there is provided a method for storing data in a memory array of a transponder. Therein, a data file system for storing data within the memory array is defined by a predetermined protocol. The data file system comprises a capability container file containing management data and an application data file for storing application data. The capability container file includes an application data file control data block containing information to control or manage the application data file. The application data file includes an application data length indicator indicating a memory size of first application data stored in the application data file in compliance with the predetermined protocol. The method comprises the steps of checking whether a memory size of the application data file is larger than the memory size indicated by the application data length indicator and storing second application data in a partial memory area of the application data file not occupied by the first application data.

This aspect of the invention is based on the idea that a file system is defined in a transponder having a memory array. The file system includes file management data which are stored in a first memory block called capability container. The file management data can include e.g. information about the size of the capability container and about the size and position of application data stored in the memory array. The application data can be stored in a second memory block called application data file. This application data file can contain first application data which are stored in compliance with a predetermined protocol. According to the predetermined protocol the memory size or length (e.g. the number of bits or bytes) of the first application data is indicated by a specific indicator called application data length indicator which is also stored within the application data file. Knowing both the memory size of the stored first application data and the memory size available in the application data file it can be checked whether there is non-used memory in the application data file in which no first application data are stored. If so, this non-used memory can be exploited for storing additional second application data. These second application data need not be stored in compliance with the predetermined protocol.

The method of the first aspect uses the data file system in accordance with the predetermined protocol but includes the additional feature that additional second application data can be stored in the memory areas of the transponder which are not allowed to be accessed by a read/write device operating in compliance with the predetermined protocol (also referred as "protocol compliant read/write device").

Amongst others, the following advantages can be achieved with the invention:

First, memory space which according to the predetermined protocol is not used can be used for storing additional second application data. For example, the application data file can have a standard memory size which is commonly larger than the memory size of first data stored therein. According to the present invention, the unused memory space in the application data file can be exploited for storing additional second application data not in compliance with the predetermined protocol.

Second, a protocol compliant reader device will only access memory areas of the application data file for which it is indicated, e.g. by an indicator included at the beginning of the application data file, that first application data are stored therein in compliance with the protocol. Additional second application data which is stored in other memory areas of the application data file can be effectively hidden from access of such protocol compliant reader device. At the same time, the first data conventionally stored within the application data block in accordance with the protocol will not interfere with the additional second application data. This provides backwards compatibility, i.e. a read/write device operating in accordance with the method of the present invention will manipulate the data structure within the memory of a transponder only in a way that it remains compatible with conventional protocol compliant read/write devices.

In the following further details, definitions, features and characteristics of the method of the first aspect are given.

A transponder can be an active element, i.e. having a power source, or a passive element, i.e. without power source, being adapted for near field communication. For example, a transponder can be a RFID tag or a contactless card. Alternatively, the transponder can be an active device which emulates e.g. a tag. For example, the transponder can be included in a mobile phone having a battery wherein the transponder emulates the functions of an RFID tag such that a user can use his mobile phone like an RFID tag. The transponder can include a circuitry establishing an array of volatile or rewritable memory of predetermined size such as for example 64 Bytes or more.

A protocol can be used as a standard or specification defining how data are to be stored in the memory e.g. in terms of order and content. For example, the protocol can define which information is to be stored at a specific position within the memory array. Furthermore, the protocol can specify indicators or flags. A protocol specifically adapted for transponders is the "Type 4 Tag Operation specification" of the NFC Forum. It specifies, with a set of rules and guidelines, the operation of a NFC Forum Type 4 Tag which can be a tag, card or token compatible with the NFC Forum Type 4 specification and including a contactless IC chip which has build-in memory and memory access functions. This protocol also defines how application data defined according to the NFC Data Exchange Format (NDEF) is detected, read from, and written to the Type 4 Tag in order to achieve and maintain interchangeability and interoperability at the NFC Forum Type 4 Tag read/write level.

The data file system within the memory array of the transponder can include several elementary files.

The application data file can be used for storing any kind of application data. For example, data specific to an application to be run in the transponder or in a coupled read/write device can be stored. Alternatively, user specific data including e.g. authentification information can be stored. If the Type 4 Tag Operation specification of the NFC Forum is used as the protocol, the application data can include the NDEF message as specified in this protocol.

The capability container file can include control data which can be used to control and manage data to be stored within the data file system. For example, data as to the size of the capability container itself, as to the existence, size or position of first application data stored in the application data file in compliance with the predetermined protocol and further data e.g. concerning predetermined features of the transponder can be stored in the capability container.

The additional second application data to be stored in non-occupied memory areas of the application data file in accordance with the present invention can include any kind of data. It is not limited to a specific data format. E.g. it can avoid to use the overhead required by "Type 4 Tag Operational" specification draft and NFC Data Exchange Format (NDEF) as will be understood from the description further below.

According to the predetermined protocol, an indicator, herein called application data length indicator, which indicates the memory size, i.e. for example the number of bytes, of first application data stored in the application data file is stored within the application data file. This indicator can be stored anywhere within the application data file but is located preferably at the beginning of the application data file. For example, the indicator can be included in the first one or more bytes of the application data file and can be directly followed by the first application data. Accordingly, the address of the end of the application data within the application data file can be derived from the stored application data length indicator.

According to the invention it is checked whether a memory size of the application data file is larger than the memory size indicated by the application data length indicator. This can be done e.g. by analyzing the size of the application data file and subtracting the indicated application data length. The result is the size of partial memory areas which are not used for storing first application data. If this result is different from zero, it will be recognized that there is non-used memory within the application data file which, according to the present invention, can be used for storing additional second application data. The additional second application data can be stored anywhere within the memory area not occupied by the first application data. For example, it can be stored directly behind the end of the first application data. It can be stored as one continuous data block or, alternatively, as a plurality of data chunks According to an embodiment of the method the application data file control data block included in the capability container file includes an application data file length indicator indicating a memory size of the application data file. Then, the checking whether a memory size of the application data file is larger than the memory size indicated by the application data length indicator can be done by comparing the application data file length indicator and the application data length indicator. In other word, it can be determined whether there is a memory area not occupied by first application data by comparing (e.g. by calculating the difference of) an indicator indicating the size of memory space available in the application data file and an indicator indicating the size of stored first application data, i.e. the memory size actually occupied by first application data.

Alternatively, the application data file length indicator can also be stored anywhere else in the memory array such as in the application data file itself.

In a further embodiment of the first aspect the method further includes storing a second application data indicator indicating that second application data is stored within the application data file. This second application data indicator can be a simple flag just indicating the existence of additional second application data. In this case, a reader device reading such flag can know that it must search for additional second application data somewhere in the memory not occupied by first application data.

Alternatively, the second application data indicator can comprise at least one of data indicating a storage address, a field length, a number of data fields and a type of second application data stored in the partial memory area of the application data file not occupied by the first application data. Then, the method can be performed taking into account at least one of these data. Thereby, the additionally stored second application data can be managed more efficiently and can be found faster by a reader device.

Preferably, the second application data indicator is stored within the application data file. E.g. it can be stored directly behind the application data length indicator indicating the size of first application data stored in compliance with the predetermined protocol. In a second aspect of the present invention, a method for reading data in a memory array of a transponder is provided. Therein, a file system defined by a predetermined protocol as outlined above is defined. The method comprises reading second application data stored in a partial memory area of the application data file not occupied by the first application data.

The second aspect is based on the idea that, according to the predetermined protocol, first application data are stored within the application data file. The existence and the location of such first application data is indicated in accordance with the rules of the predetermined protocol. Accordingly, a protocol compliant reader device will only read the first application data and then stop operating. It will neither search for nor read additionally stored second application data. In accordance with the second aspect of the present invention, the conventional read method is modified in that also second application data, which must not be stored in compliance with the protocol, are read.

According to an embodiment of the second aspect, the method further comprises the step of searching for a second application data indicator indicating that second application data is stored within the application data file. Such second application data indicator can cause a reader device operating in compliance with the present invention to actively search for additionally stored second application data whereas, when no such indicator is present, the reader device will not search for additional application data. This can accelerate the overall working performance of a reader device.

As outlined above, the second application data indicator can comprise at least one of data indicating a storage address, a field length, a number of data fields and a type of second application data stored in the partial memory area of the application data file not occupied by the first application data. Thereby, the overall working performance of a reader device and the access speed to additionally stored second application data can be accelerated.

In an embodiment of the above first or second aspect, the predetermined protocol is the Type 4 Tag Operation specification of the NFC Forum. This protocol is specifically suited for the use in RFIDs, contactless cards and other NFC devices.

In a third aspect of the invention a transponder is provided in which data is stored and can be read in accordance with one of the above aspects or embodiments. The transponder can be an RFID tag or a contactless smart card or a device emulating such devices.

In a fourth aspect of the invention a read/write-device is provided which is adapted to perform the method according to one of the above aspects or embodiments.

In a fifth aspect of the invention a computer readable medium is provided, the medium including a program element adapted to perform the method according to one of the above aspects or embodiments.

In a sixth aspect of the invention a program element is provided which is adapted to perform the method according to one of the above aspects or embodiments.

On the basis of the above given and the following explanation of the methods for storing or reading data in a transponder a skilled person will we able to translate the steps of the method into a computer program element for carrying out the method.

It has to be noted that embodiments of the invention are described with reference to different subject matters. In particular, some embodiments are described with reference to apparatus type claims whereas other embodiments are described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

The aspects defined above and further aspects of the present invention are apparent from the examples of embodiment to be described hereinafter and are explained with reference to the examples of embodiments. The invention will be described in more detail hereinafter with reference to examples of embodiments but to which the invention is not limited.

DETAILED DESCRIPTION OF THE EMBODIMENTS

The Type 4 Tag Operational specification Version 1.0 of the NFC Forum (herein also called the "type 4 tag protocol") is used as the predetermined protocol. Main features of this protocol are described herein. A read/write device which is adapted to operate in accordance with the type 4 tag protocol will also be referred as "NFC Forum Device" herein. Application data which are conventionally read from or written to a type 4 tag in accordance with the type 4 tag protocol will be referred to as either "NFC Forum defined data" or as NDEF message.

The following conventions and notations apply in this document unless otherwise stated:

Binary numbers are represented by strings of digits 0 and 1 shown with the most significant bit (msb) left and the least significant bit (lsb) right, "b" is added at the end.
Example: 11110101b Hexadecimal numbers are represented is using the numbers 0-9 and the characters A-F, a "h" is added at the end. The Most Significant Byte (MSB) is shown on the left, the Least Significant Byte (LSB) on the right.
Example: F5h Decimal numbers are represented as is (without any tailing character).
Example: 245

Figure 1:
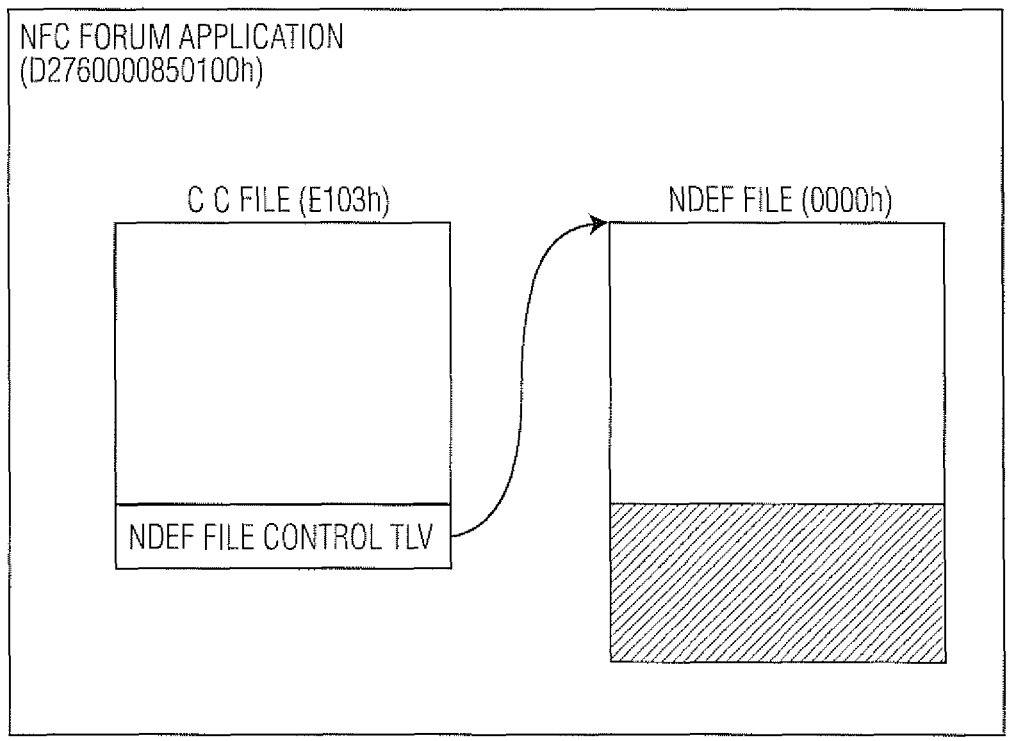
FIG. 1 shows an example of a data file system in accordance with the Type 4 tag Operation specification of the NFC Forum.

In FIG. 1 a file system in accordance with the type 4 tag protocol is represented. The Type 4 tag shall contain at least one NFC Forum application. The NFC Forum application defines the way to handle NDEF messages on a Type 4 tag providing a file system composed of at least two elementary files (EF files) in accordance with ISO/IEC 7816-4 "Identification cards—Integrated circuit cards—Organization, security and commands for exchange", namely a capability container file (CC file) and a NFC Data Exchange Format file (NDEF file).

The following sections describe how the NFC Forum defined data are stored and accessed by a NFC Forum device.

NDEF Management

The NFC Forum defined data is stored in the Type 4 tag using the NFC Forum application with ISO identifier equal to D2760000850100h. The NFC Forum application contains the Capability Container (CC) that shall be used to detect and access NFC Forum defined data. The CC file contains management data, and it is stored inside a read-only elementary file EF, see ISO/IEC 7816-4.

The data structure of the CC file is described in Table 1. The CC file shall contain from offset 0000h to 0006h the fields: CCLEN, Mapping Version, $ML_e$ and $ML_c$. One NDEF File Control TLV shall be present at the offset 0007h. Zero, one or more TLV blocks may be present from offset 000Fh.

TABLE 1

Data Structure of the Capability Container file

| Offset (bytes) | Size (bytes) | Field | Remarks |
| --- | --- | --- | --- |
| 0h | 2 | CCLEN (bytes) | Indicates the size of this capability container (including this field). Valid CCLEN values are between 0000h and FFFEh, FFFFh is reserved for future use. |
| 2h | 1 | Mapping Version | Indicates the mapping specification version it is compliant to. The most significant nibble (the 4 most significant bits) shall indicate the major version number, and the least significant nibble (the 4 least significant bits) shall indicate the minor version number. |
| 3h | 2 | $ML_e$ (bytes); Maximum R-APDU data size | This value defines the maximum data size that can be read from the Type 4 tag using a single ReadBinary command. The valid values are $ML_e$ = 000Fh-FFFFh. The values between 0000h-0000Eh are reserved for future use. |
| 5h | 2 | $ML_c$ (bytes); Maximum C-APDU data size | This value defines the maximum data size that can be sent to the Type 4 tag using a single UpdateBinary command. The valid range is $ML_c$ = 0001h-FFFFh bytes. The value 0000h is RFU. |
| 7h | 8 | NDEF File Control TLV | TLV block that contains information to control and manage the NDEF file |
| Fh | x | TLV Blocks | Zero, one or more TLV blocks may be starting from offset Fh |

NOTE
x indicates the size of the proprietary data.

TLV Blocks

A TLV block shall consist of one to three fields:

T The tag field shall identify the type of the TLV block, see Table 2, and shall consist of a single byte encoding a number from 00h to FEh. The tag field values from 00h to 03h, from 06h to FFh are reserved for future use by the NFC Forum. NFC Forum Devices shall ignore those TLV blocks that make use of reserved tag values and Type 4 tags shall not use them.

L The length field shall provide the size in bytes of the value field. It has two different formats composed of one, or three bytes. The NFC Forum Device shall understand all two length field formats. However, depending on the tag field value, the length field may not be present.

One byte format: The one byte format shall code the length of the value field between 00h and FEh bytes. This byte shall be interpreted as a cardinal if the value is between 00h and FEh. If it contains FFh the value shall be interpreted as flag that specifies that the length field is composed of more than one byte.

Three consecutive bytes format: This format shall code the length of the value field between 00FFh and FFFEh bytes. The first byte is assumed to be a flag equal to FFh indicating that two more bytes length shall be interpreted as word. This word shall be interpreted as a cardinal if the value is between 00FFh and FFFEh. The value FFFFh is reserved for future use (RFU).

V If the length field is equal to 00h or there is no length field, there shall NOT be the value field, i.e. the TLV block is empty. If there is the length field and indicates a length of the value field N bigger than zero (N>0), the value field shall consist of N consecutive bytes.

Table 2 lists the TLV blocks specified by the Type 4 tag protocol that are described in the following sections.

TABLE 2

Defined TLV blocks

| TLV block name | Tag Field Value | Short Description |
| --- | --- | --- |
| NDEF File Control TLV | 04h | It contains control information concerning the EF file containing the NDEF message |
| Proprietary File Control TLV | 05h | It contains control information concerning the Proprietary file containing the proprietary data |

NDEF File Control TLV

The NDEF File Control TLV shall be always present inside the Type 4 tag. It provides control information about the EF file containing the NDEF message. The NFC Forum Device shall be able to read/process the NDEF File Control TLV. The CC file shall contain one or more NDEF File Control TLV.

Below the encoding of the 3 TLV fields of NDEF File Control TLV are shown:

T shall be equal to 04h.

L shall be equal to 06h.

V shall be composed of 6 bytes that specifies size, read access conditions and write access conditions, and EF identifier of the EF file containing the NDEF message. The 6 bytes shall be encoded in the following way:

File Identifier, 2 bytes. Indicates the NDEF file. The valid range is 0000h-FFFEh, except the values E102h, E103h, 3F00h, and 3FFFh. The values 3F00h, 3FFFh are reserved and FFFFh is reserved for future use (see ISO/IEC 7816-4).

Maximum NDEF file size, 2 bytes. Maximum size in bytes of the NDEF file. This size does not reflect the size of the contained NDEF message as such but rather the size of the created file containing the NDEF message. The valid range is 0005h-FFFEh. The values 0000h-0004h, and FFFFh are reserved for future use.

NDEF file read access condition, 1 byte:
the value 00h indicates read access granted without any security,
the values from 01h to 7Fh and FFh are reserved for future use, and
the values from 80h to FEh are proprietary.

NDEF file write access condition, 1 byte:
the value 00h indicates write access granted without any security,
the value FFh indicates no write access granted at all (read-only),
the values from 01h to 7Fh are reserved for future use, and
the values from 80h to FEh are proprietary.

Proprietary File Control TLV

The Proprietary File Control TLV shall contain control information about the Proprietary file. The Proprietary file is an EF file that contains proprietary information (see below). The CC file shall contain zero, one or more Proprietary File Control TLV. The NFC Forum Device shall be able to read/process this TLV block. The NFC Forum Device may ignore the data contained in the Proprietary File Control TLV. Below the encoding of the 3 TLV fields of Proprietary TLV are shown:

T shall be equal to 05h.

L shall be equal to 06.

V shall be composed of 6 bytes that specifies size, read access conditions and write access conditions, and EF identifier of the EF file containing the proprietary data. The 6 bytes shall be encoded in the following way:

File Identifier, 2 bytes. Indicates the Proprietary file. The valid range is 0000h-FFFEh, except the values E102h, E103h, 3F00h, and 3FFFh. The values 3F00h, 3FFFh are reserved and FFFFh are reserved for future use (see ISO/IEC 7816-4).

Maximum Proprietary file size, 2 bytes. Maximum size in bytes of the Proprietary file. The valid range is 0001h-FFFEh. The value FFFFh is reserved for future use.

Proprietary file read access condition, 1 byte:
the value 00h indicates read access granted without any security,
the values from 01h to 7Fh and FFh are reserved for future use, and
the values from 80h to FEh are proprietary.

Proprietary file write access condition, 1 byte:
the value 00h indicates write access granted without any security,
the value FFh indicates no write access granted at all (read-only),
the values from 01h to 7Fh are reserved for future use, and
the values from 80h to FEh are proprietary.

The proprietary data shall be stored inside an EF file (see ISO/IEC 7816-4) called Proprietary file using the data structure described in Table 3. An NFC Forum application may have zero, one or more Proprietary files.

TABLE 3

Data Structure of the Proprietary File

| Offset (bytes) | Size (bytes) | Field | Remarks |
| --- | --- | --- | --- |
| 0h | 2 | PLEN [bytes] | The Proprietary Length field (PLEN) indicates the size of the proprietary data stored in the Proprietary file. Valid PLEN values are between 0000h and FFFEh, FFFFh is reserved for future use. |
| 2h | X | proprietary data | proprietary data |

NOTE
x indicates the size of the proprietary data.

NDEF Storage

The NDEF message shall be stored inside an EF file called NDEF file using the data structure described in Table 4. An NFC Forum application may have one or more NDEF files.

TABLE 4

Data Structure of the NDEF file

| Offset | Size | Field | Remarks |
|---|---|---|---|
| 0h | 2 | NLEN [bytes] | The NDEF Length field (NLEN) indicates the size of the NDEF message stored in the NDEF file. Valid NLEN values are between 0000h and FFFEh, FFFFh is reserved for future use. |
| 2h | x | NDEF message | NDEF message |

NOTE
x indicates the size of the proprietary data.

The NDEF file may contain either empty or non-empty NDEF message.

Figure 2:
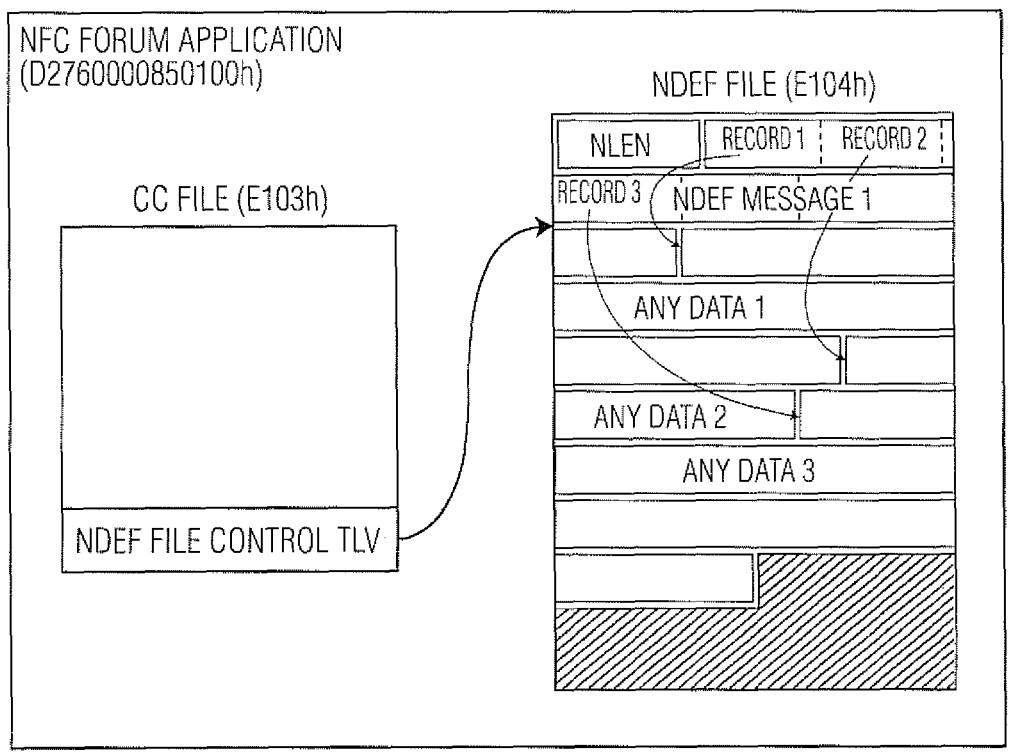
FIG. 2 shows an exemplary data file system which can be read or written according to an embodiment of the present invention.

FIG. 2 shows a data file structure which can be read and written in accordance with an embodiment of the invention. It contains at least 2 elementary files:

CC file: the Capability Container file contains management data and the File Identifier (in the picture is E104h) of the mandatory NDEF file (inside the NDEF File Control TLV), additional NDEF files, and proprietary files.

NDEF file: the NDEF file contains an NDEF message. The 2 bytes at the beginning of the NDEF file indicates the overall length of the NDEF message.

Figure 3:
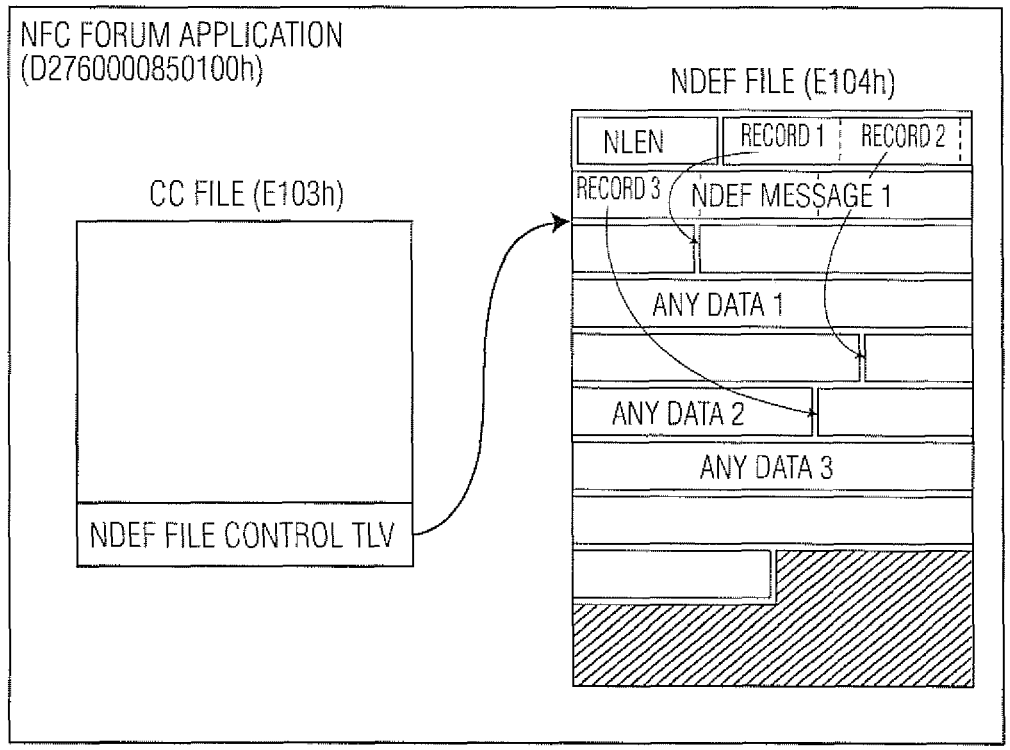
FIG. 3 shows storage of additional data according to the system of FIG. 2.

Inside the NDEF file, after the NDEF message is a memory area which is exploited according to the method of this embodiment to store additional application data (called in the picture Any Data 1, Any Data 2 and Any Data 3), as depicted in FIG. 3.

The indication of the existence of the additional data may be:

contained inside any NDEF message of NDEF files, proprietary files, or the CC file, and indicated by the unique identifier of the tag and any information related to the tag itself and not to the data stored in it.

In the example, the indication of the existence of Any Data 1, 2 and 3 is stored inside the records of the NDEF message of the NDEF file.

The additional data may be located anywhere inside the empty memory area after the NDEF message, and may be split into different non-contiguous chunks. If needed the indication of the existence of the additional information may contain the position and/or size of these chunks.

In order to recapitulate the above described embodiments of the present invention one can state:

The "Type 4 Tag Operational" draft specification shows how to store data inside a specific type of contactless cards or tags. This invention provides an additional way to store data inside the tag. It may be used for example to extend the memory area of new application versions, remaining backward compatible with the old ones. Moreover it provides a way to store data inside the tag data that cannot be seen by an NFC Forum reader device. This functionality may be used to store any kind of data in any kind of format. For example this allows storing data without the overhead proposed by the type 4 tag protocol and NFC Data Exchange Format (NDEF).

The invention provides an additional method to store data inside any contactless card or tag compliant to the type 4 tag protocol. It is intended for any NFC Forum Device e.g. mobile phones, PDA, that stores data inside NFC Forum Type 4 Tags.

Possible advantages of this solution are inter alia:

exploitation of non-used memory area: the data is stored in non-used memory area of the Type 4 Tag, capability to hide data in non-used memory areas being not visible using NFC Forum compliant reader devices, the method can be used by NFC application that need an additional memory area to store data without touching the one defined by the NFC Forum standardization e.g. due to backward compatibility reasons.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

The invention claimed is:

1. An apparatus for storing data in a memory array of a transponder, wherein a data file system for storing data within the memory array is defined by a predetermined protocol, the data file system comprising:

a capability container file containing management data;

an application data file for storing application data;

wherein the capability container file includes an application data file control data block containing information to control the application data file;

wherein the application data file includes an application data length indicator indicating a memory size of first application data stored in the application data file in compliance with the predetermined protocol;

the apparatus comprising:

means for checking whether a memory size of the application data file is larger than the memory size indicated by the application data length indicator;

means for storing second application data in a partial memory area of the application data file not occupied by the first application data.

2. The apparatus of claim 1 wherein the predetermined protocol is the Type 4 tag Operation specification of the Near Field Communications (NFC) Forum.

3. The apparatus of claim 1 wherein the predetermined protocol is the Type 4 tag Operation specification of the Near Field Communications (NFC) Forum.

4. An apparatus for reading data in a memory array of a transponder, wherein a data file system for storing data within the memory array is defined by a predetermined protocol, the data file system comprising:

a capability container file containing management data;

an application data file for storing application data;

wherein the capability container file includes an application data file control data block containing information to control the application data file;

wherein the application data file includes an application data length indicator indicating a memory size of first application data stored in the application data file in compliance with the predetermined protocol;

the apparatus comprising:

means for reading second application data stored in a partial memory area of the application data file not occupied by the first application data.

* * * * *